F. A. B. KOONS.
Roller for Paper-Making and Other Machines.
No. 207,287. Patented Aug. 20, 1878.
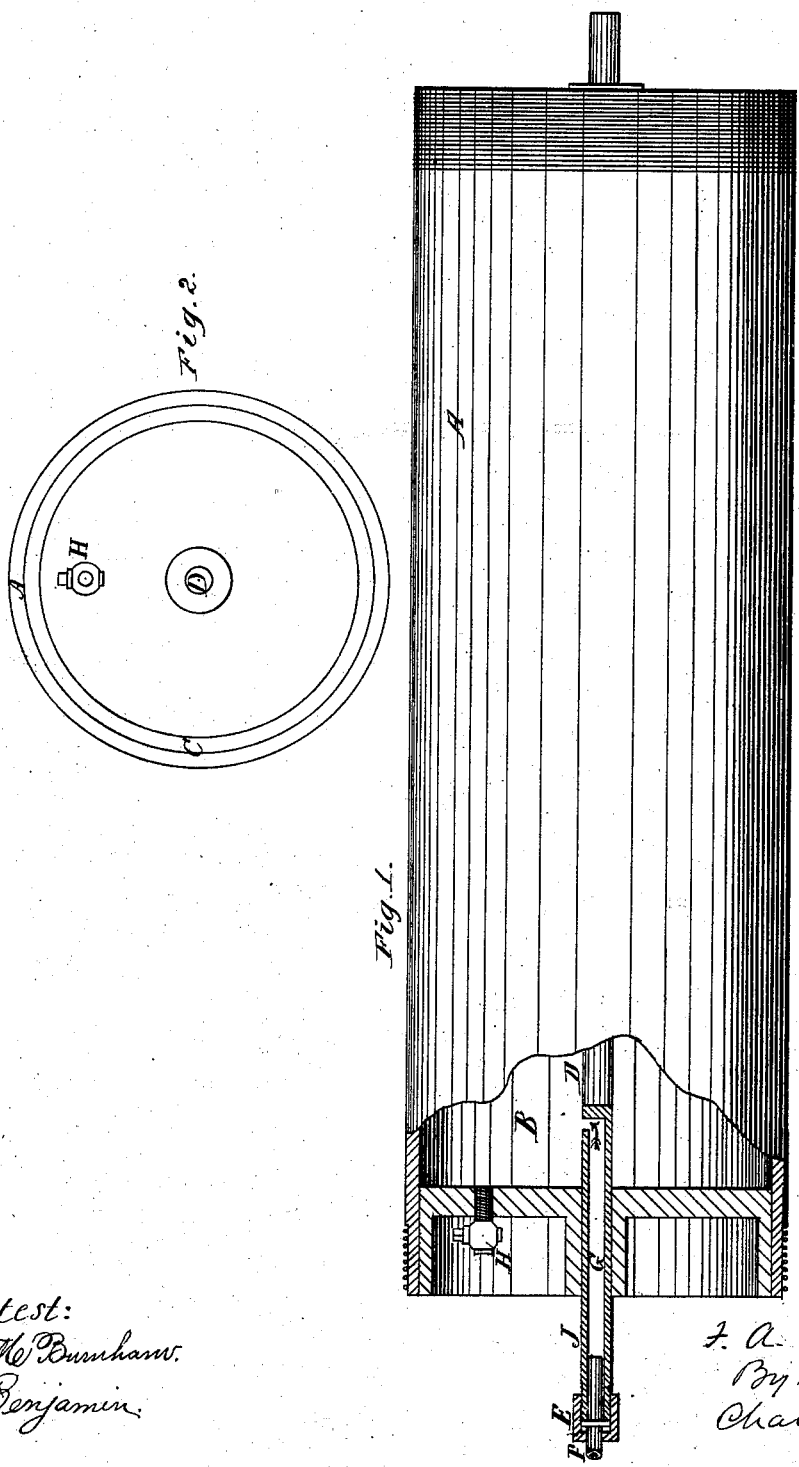

UNITED STATES PATENT OFFICE.

FRANK A. B. KOONS, OF SHICKSHINNEY, PENNSYLVANIA.

IMPROVEMENT IN ROLLERS FOR PAPER-MAKING AND OTHER MACHINES.

Specification forming part of Letters Patent No. 207,287, dated August 20, 1878; application filed February 23, 1878.

*To all whom it may concern:*

Be it known that I, FRANK A. B. KOONS, of Shickshinney, Luzerne county, Pennsylvania, have invented a Roller for Paper-Making and other Machines, of which the following is a specification:

My invention is a roller specially adapted for use as a coucher for paper-making machines, constructed with a flexible body, as fully described hereinafter, so as to insure a more effective operation, prevent the adhesion of lime, dirt, &c., and afford increased durability.

In the drawing, Figure 1 is a longitudinal view, partly in section, of my improved roller, and Fig. 2 an end view.

D is a shaft adapted to suitable bearings on the frame of the machine in which the roller is used, and either hollow or with a channel, G, at one or both ends.

To the shaft are secured two disks or heads, C, having wide peripheries, over which extend the ends of a flexible sleeve or hollow cylinder, A, constituting the body of the roller, the cylinder being secured to the heads by bands, wire, or in any suitable manner.

Although various materials may be employed for the flexible cylinder, I prefer to use rubber, strengthened by an embedded sheet of duck or fabric.

The channel G of the shaft D communicates with the space within the cylinder, and water, air, or other fluid compressible or inelastic under pressure, if desired, is admitted through a pipe, F, communicating with any suitable reservoir, and coupled by means of an ordinary coupling-box and packing, so that the cylinder can turn independently of the supply-pipe.

The fluid admitted in the body of the roller acts to slightly distend the latter or keep it in shape, so that as the roller revolves every portion of the face will be brought into close contact with the surface beneath it, however irregular the latter may be.

The roller is especially adapted to act as a coucher for paper-making machines, where the flexibility of the body, acting with a pressure capable of being regulated with the utmost nicety, secures a most effective result, while the material of which it is made prevents the adhesion of dirt, avoiding the repeated cleanings necessary in ordinary rollers, and possesses qualities which insure the durability of the roller in its perfect condition much beyond that which could otherwise be obtained.

I do not limit myself to the use of the improved roller in paper-machines, as it will be apparent that it may be employed in many other positions where its peculiar qualities render it desirable.

It will be obvious that the roller may be differently constructed, and that the fluid, instead of being fed continuously through the hollow journal, may be introduced through a suitable cock in one of the heads, and then retained by closing the cock.

Either head of the roller may be provided with a cock, H, through which the fluid may be withdrawn.

I claim—

1. The roller for paper-making machines and other purposes provided with a hollow flexible body unsupported by rigid material, as and for the purpose set forth.

2. The roller having a hollow flexible body and containing fluid confined or under pressure, as and for the purpose specified.

3. The combination of the shaft D, heads C, channel G, and flexible hollow body A, secured to the heads, all substantially as set forth.

In testimony whereof I have signed my name to this specification in the presence of two subscribing witnesses.

F. A. B. KOONS.

Witnesses:
 CHARLES E. FOSTER,
 JNO. D. PATTEN.